INVENTOR.
John J. Henry

Sept. 5, 1961

J. J. HENRY 2,999,168

LINEAR COUNT-RATE METER

Filed July 21, 1960

INVENTOR.
John J. Henry
BY Roland A. Anderson
ATTORNEY

United States Patent Office 2,999,168
Patented Sept. 5, 1961

2,999,168
LINEAR COUNT-RATE METER
John J. Henry, Oak Ridge, Tenn., assignor to the United States of America as represented by the United States Atomic Energy Commission
Filed July 21, 1960, Ser. No. 44,484
7 Claims. (Cl. 307—88.5)

This invention relates to an improved counting-rate meter system to provide a highly linear output while receiving counting rates from one cycle per second to 100,000 cycles per second. This meter has numerous applications. One application, for example, would be to indicate the counting rate from a proportional radiation detector.

Prior art count-rate meters have many objectionable characteristics. Among these characteristics are objectionable zero drift, inefficient resolving time and circuit recovery time, and inability to receive and count large counting rates (up to 100,000 cycles per second) and at the same time to provide a linear output for such large counting rates.

With a knowledge of the above limitations of prior art count-rate meters, it is a primary object of this invention to provide a count-rate meter that will measure counting rates up to 100,000 cycles per second with a substantially linear output.

It is another object of this invention to provide a linear count-rate meter that has a minimum zero drift and that has a relatively fast resolving time and circuit recovery time.

These and other objects and advantages of this invention will become apparent upon a consideration of the following detailed specification and the accompanying drawings wherein.

The above objects have been accomplished in the present invention by feeding a series of input pulses, to be counted, into a discriminator, modified to increase its linearity. The output pulses from the discriminator are then fed into a trigger circuit which converts the pulses to positive pulses of uniform width and amplitude. The output from the trigger circuit is fed into a one-shot multivibrator. The multivibrator is provided with means for setting the width of its output pulses at any one of several values. The multivibrator includes a diode feedback circuit for the transistors employed in this portion of the overall system. This arrangement prevents saturation of these transistors with the result that the output pulse width is essentially a linear function of the value of the selected width-setting condenser. Prevention of saturation also improves the rise and decay times of the output pulse and greatly decreases circuit recovery time. The output from the multivibrator is fed into a special diode-switched, constant current metering circuit. A selected constant current source is electronically switched to an averaging circuit in response to each pulse received, and the duration in which the source is thus connected is a function of the pulse width of the received pulse. The average current through an output meter is then equal to the product of the counting-rate, the constant current, and the multivibrator output pulse width.

Figure 1:
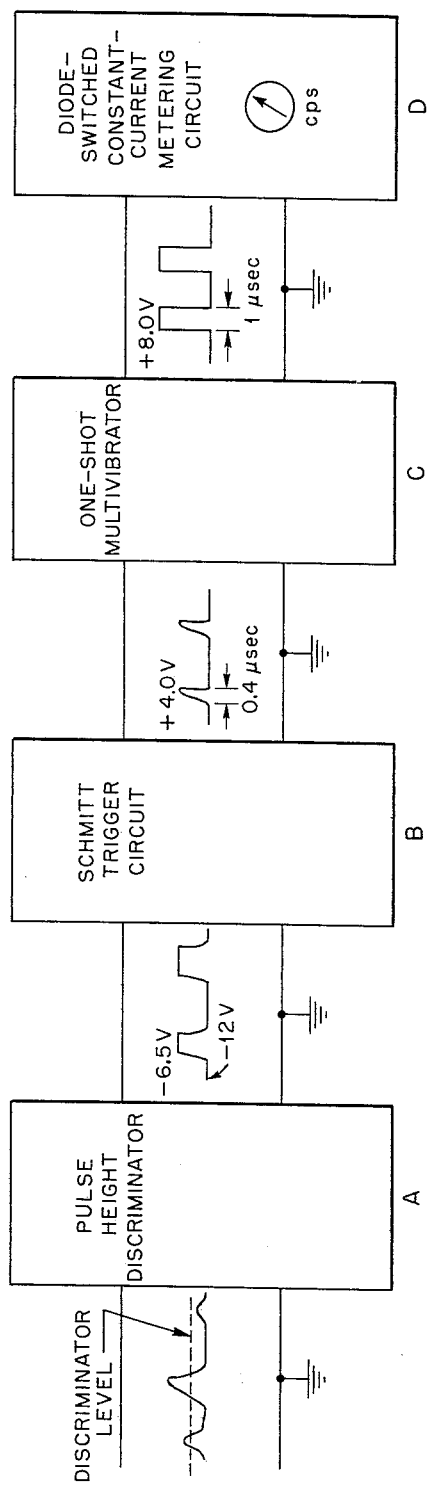
FIG. 1 is a block diagram of the count-rate meter of this invention.

FIG. 1 illustrates one embodiment, in block diagram form, in which the principles of this invention may be carried out. As an example, this invention will be described as designed to indicate the counting rate from a proportional radiation detector, such as a photomultiplier tube. It will be assumed that the output pulses from the photomultiplier tube have been suitably amplified in a phase-inverter amplifier or the like before they are fed into the count-rate meter. In this instance, the input to the count-rate meter would comprise a series of randomly spaced, positive voltage pulses of varying amplitudes. An input of this character is indicated schematically in FIG. 1. A typical input of this nature comprises pulses which vary in amplitude from 0 to 6 volts, which have a width of about 2 microseconds, and which occur at rates of from one cycle per second to 100,000 cycles per second, with random pulse-to-pulse spacing. The input to the count-rate meter circuit is fed directly into a pulse-height discriminator A. The discriminator responds only to those pulses whose amplitude exceeds a selected minimum value. In response to each such above-minimum pulse, the discriminator generates an amplified voltage pulse. As indicated by the waveform in FIG. 1, the output from the discriminator constitutes a series of randomly spaced pulses of substantially equal amplitude. The width of the output pulses varies with the height of the discriminator input pulses.

The output from the discriminator A is fed into a conventional Schmitt trigger circuit B which converts the pulses, on a one-to-one basis, to positive pulses of uniform width and amplitude as indicated by the waveform in FIG. 1. The trigger circuit B responds to the leading edge of the input pulses, with the result that the timing of the output pulses from the trigger circuit corresponds to that of the pulses received from the discriminator.

The output from the trigger circuit B is fed into a one-shot multivibrator C. The trigger circuit is designed to deliver uniform pulses whose width is less than the minimum width of the output pulses of the multivibrator as indicated by the respective waveforms shown on FIG. 1. The multivibrator responds to each input pulse by generating a positive, square-wave pulse, and is provided with means for setting the width of its output pulses at any one of several values.

The square-wave output from the multivibrator is fed into a special diode-switched, constant current metering circuit D. As will be described below, this metering circuit includes means for generating a constant current and means for at times switching this constant current through an integrating circuit including an output meter. The design of the circuits A, B, C, and D ensures that the average current through the output meter is directly proportional to the counting rate of the input pulses which may be from a radiation detector, for example.

Figure 2:
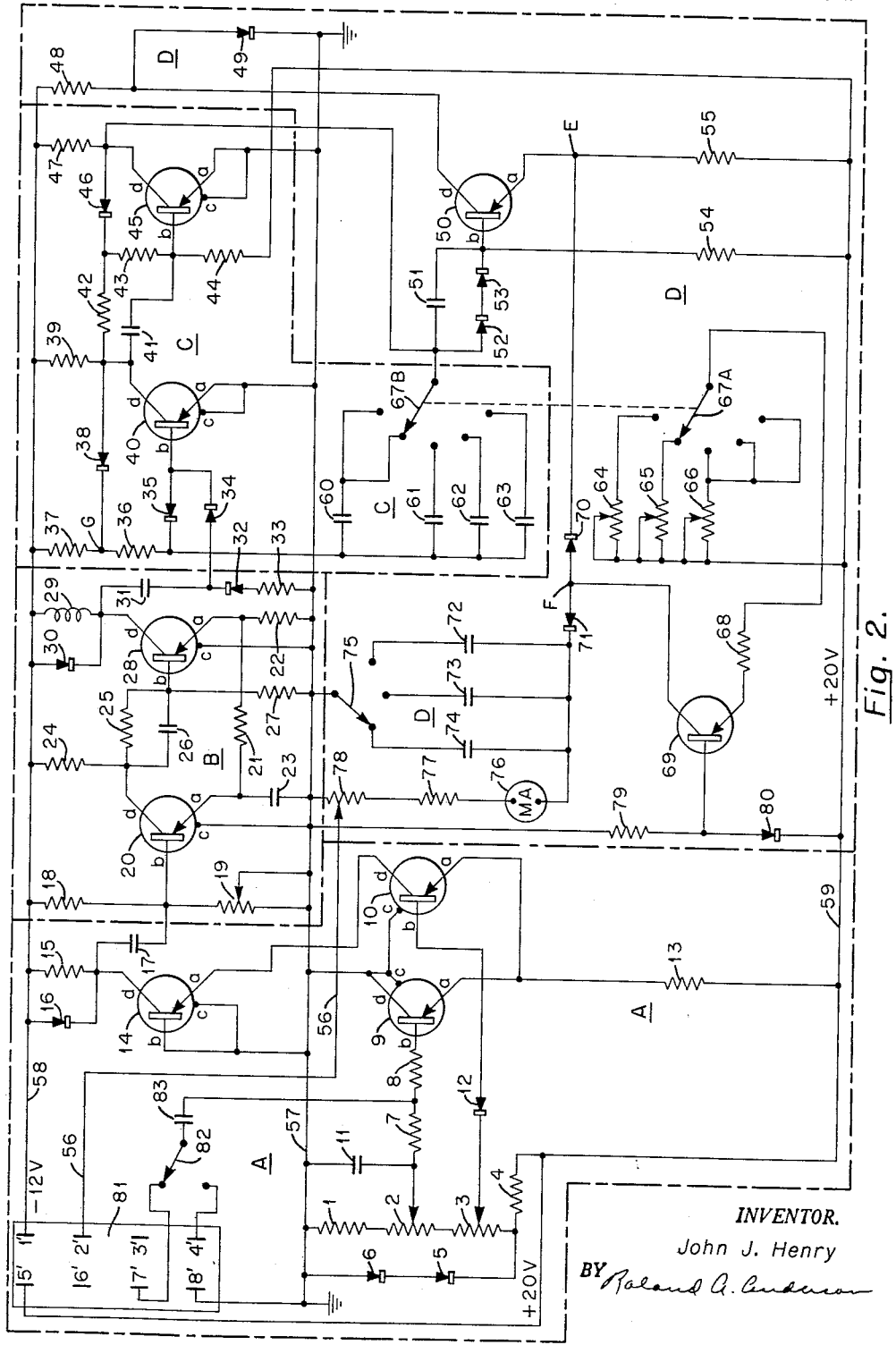
FIG. 2 is a detailed schematic wiring diagram of the system of FIG. 1.

FIG. 2 shows the circuit details of the system of FIG. 1, which will now be described. The pulse-height discriminator includes two standard transistors 9 and 10 which are connected in the emitter-follower configuration, as shown, and are provided with a common load resistor 13, which in turn is connected to a +20 volt bus 59. Bus 59 is connected to a source of positive potential, not shown, through the terminal 5' in the Amphenol connector 81. A voltage divider comprised of four series connected resistances 1, 2, 3, and 4 is connected between a ground bus 57 and the positive bus 59. Two 5.5 volt Zener diodes 5 and 6 are connected across resistances 1, 2, and 3 for voltage regulation. Resistance 2 is a linear potentiometer which is used to adjust the base line of the discriminator. Resistance 3 is made adjustable to permit setting of the discriminator zero level by biasing transistor 10 through an interconnecting point-contact germanium diode 12.

The discriminator responds to positive input pulses having an amplitude exceeding the voltage difference between the wiper of potentiometer 2 and the base of transistor 10. In the absence of an input pulse, transistor 10 is normally biased off, since its base is more positive than that of transistor 9, and the emitters of both transistors are at a voltage essentially equal to that of the wiper of potentiometer 2.

The effective input signal to the discriminator is developed across a fixed resistor 7. A condenser 11 is connected from the junction of resistor 7 and the wiper of potentiometer 2 to ground bus 57 to minimize variations in the input impedance resulting from changes in the setting of potentiometer 2. Resistor 7 is connected through a back-current-limiting resistor 8 to the base of transistor 9. The input signal to the discriminator is fed from a source of pulses to be counted, not shown, to the terminal 7' of the connector 81. Terminal 7' is connected through the upper contact of a selector switch 82, and through condenser 83 to the junction of resistors 7 and 8. The lower contact of switch 81 is used to connect the discriminator to ground for the purpose of calibrating the system.

When a positive input pulse of sufficient amplitude is developed across resistor 7 and applied to the base of transistor 9 through resistor 8, the voltages on the emitters of transistors 9 and 10 tend to follow the input pulse. As the emitter voltage swings more positive than the base of transistor 10, transistor 10 conducts. The emitter voltage then is controlled by transistor 10, and transistor 9 is cut off for the duration of the pulse.

As shown, an impedance-matching transistor amplifier 14 is directly coupled to the collector of the transistor 10. The base of transistor 14 is connected to the ground bus 57. The output signal from the transistor amplifier 14 is developed across a resistor 15 which is connected to a −12 volt bus 58. Bus 58 is connected to a source of negative voltage, not shown, through a terminal 1' of the connector 81. A Zener diode 16 is connected across the resistor 15 to limit the amplified output pulses to a maximum of 5.5 volts.

The linearity of the discriminator circuit is improved substantially by utilizing the diode 12 in the base circuit of transistor 10 to minimize back-leakage current. The 2N247 type of transistor preferably used as transistor 10 ordinarily is characterized by back-leakage at +2 volts back bias. However, provision of the diode 12 extends the usable linear range of this transistor 10 from the usual 2 volts to more than 8 volts. The high frequency response of the transistor 10 is improved substantially by utilizing the low impedance of the base of the amplifier transistor 14 as the collector load for the transistor 10. This arrangement minimizes the adverse effects of the collector and wiring capacitance; consequently, the circuit will satisfactorily accept higher input pulse rates. When used with 2N247 drift transistors, the discriminator circuit will accept evenly spaced input pulses at rates exceeding 500 kc.

As shown, the discriminator circuit is coupled to a Schmitt trigger circuit through a condenser 17. The condenser 17 is connected to a junction between a resistor 18 and a potentiometer 19, and to the base of a transistor 20 of the trigger circuit. Resistor 18 is also connected to the −12 volt bus 58. Potentiometer 19 is also connected to the grounded bus 57. The emitter 20 is connected through a resistor 21 to the emitter of a transistor 28 of the trigger circuit. A condenser 23 is connected between the emitter of transistor 20 and the grounded bus 57 to decrease the recovery time of this transistor. The collector of input transistor 20 is connected through a resistor 25 and a parallel connected condenser 26 to the base of the output transistor 28. The junction of the collector of transistor 20 and the resistor 25 and condenser 26 is connected through a resistor 24 to the negative voltage bus 58. The junction of the base of transistor 28 and the resistor 25 and condenser 26 is connected through a resistor 27 to the grounded bus 57. The emitter of transistor 28 is connected through a resistor 22 to the grounded bus 57. The trigger circuit, which is conventional in nature, is designed to have a minimum sensitivity of about 0.1 volt. The maximum repetition rate is more than 500 kc. for evenly spaced input pulses not exceeding 6 volts. As pointed out above, the trigger circuit converts the input pulses, on a one-to-one basis, to positive pulses of uniform width and amplitude. The trigger circuit responds to the leading edge of the input pulses, with the result that the timing of the output pulses from the trigger circuit corresponds to that of the pulse received from the discriminator.

The output from the collector of transistor 28 is developed across an inductance 29. A diode 30 is connected across the inductance 29 to clip negative pulses and damp oscillations. As shown, the trigger circuit output is coupled to the base of a transistor 40 of the multivibrator circuit through a condenser 31 and diode 34. A diode 32 and resistor 33 are connected from condenser 31 to ground to decrease the recovery time of this condenser.

The input transistor 40 is normally biased "on" by base current flowing through a diode 35 and resistors 36 and 37 to the −12 volt bus 58. The circuit values are selected so that normally the transistor 40 collector is held at −4 volts. The collector of transistor 40 is connected to the base of the multivibrator output transistor 45 through resistors 42 and 43. A condenser 41 is connected across resistors 42 and 43. The collector of transistor 40 is connected to the −12 volt bus 58 through a resistor 39. The emitters of transistors 40 and 45 are connected to the ground bus 57. The base of transistor 45 is connected through a resistor 44, to the +20 volt bus 59. Resistor 44 is chosen so that when the input transistor 40 is conducting, the base of the output transistor 45 is at ground potential, rendering transistor 45 normally non-conducting. When the transistor 45 is not conducting, its collector voltage is about −12 volts.

The collector of transistor 45 is connected by a diode 46, resistor 42, and diode 38 to a junction point G between resistors 36 and 37. The output from the multivibrator is developed across a resistor 47 connected between the collector of transistor 45 and the −12 volt bus 58.

A positive input pulse to the base of the input transistor 40 decreases its collector current, and its collector voltage swings toward −12 volts. This voltage change is impressed on the base of transistor 45, which now conducts. The resulting change in the collector voltage of transistor 45 is reflected regeneratively through a range switch 67B, a condenser selected from a group of pulse-width-setting condensers 60—63, and resistors 36 and 37. As a result, the input transistor 40 is turned off, while transistor 45 remains on. The collector of transistor 45, previously at −12 volts, now is clamped at −4 volts by the network consisting of resistors 42, 43, and diode 46. Conduction of the transistor 45 is, therefore, accompanied by a change in its output of +8 volts. Normally, the voltage at the junction of the aforementioned diode 35 and resistor 36 is −4 volts. When the output transistor 45 conducts, however, the instantaneous theoretical voltage at this junction becomes +7.6 volts. The diode 35 prevents the selected previously charged width-setting condenser from overcoming the back-bias on transistor 40 and discharging through its base. The width-setting condenser does discharge, however, through resistors 36 and 37. When the condenser voltage decreases to about −.2 volt, the input transistor 40 again starts conducting. Regeneration now takes place in the opposite direction, returning the multivibrator circuit to the condition originally described, that is, transistor 40 conducting, and transistor 45 non-conducting. Thus, the time that the transistor 45 conducts is controlled by the discharge rate of the selected width-setting condenser.

The selector switch 67B provides counts-per-second ranges of $10^5$, $10^4$, $10^3$, $10^2$, and 10. The multivibrator output pulse width is 1 μsec. on the $10^5$ and $10^4$ c.p.s. ranges, 10 μsec. on the $10^3$ c.p.s. range, 100 μsec. on the $10^2$ c.p.s. range, and 1 millisecond on the 10 c.p.s. range. The maximum repetition rate on the fast-pulse condenser 60 is greater than 500 kc.

The diodes 38 and 46, in cooperation with resistors 37, 39 and 42, provide feedback circuits that prevent saturation of the transistors 40 and 45. As a result, the multivibrator output pulse width is essentially a linear function of the value of the width-setting condenser, thus simplifying the selection of these condensers. Prevention of saturation also improves the rise and decay times of the output pulse and greatly decreases circuit recovery time. The resistor 37 equals resistor 42, and resistor 39 is much smaller than resistors 42 and 43. The feedback circuits act to reduce the base currents through the transistors 40 and 45 as these transistors approach the saturation point. The operation of these feedback circuits is described briefly as applied to transistor 40, as follows. The base current for transistor 40 flows through resistors 36 and 37. The circuit valves are chosen so that normally the junction G of these resistors 36 and 37 is more positive than the anode of feedback diode 38. If the base current for transistor 40 approaches the saturation valve, enough current flows through the collector resistor 39 to swing the anode of diode 38 more positive than junction G. As a result, the diode 38 conducts. Any further positive swing in the anode voltage causes the junction G to go more positive. When this happens, less current flows through resistor 36 to the base of the transistor 40, thus preventing saturation of this transistor. The feedback circuit for the transistor 45 operates in an analogous manner to that described above for transistor 40 to prevent saturation of the transistor 45.

The output from the multivibrator which is developed across the resistor 47 is coupled through Zener diodes 52 and 53 to the base of a ratemeter driver transistor 50. These diodes provide a D.C. shift of +8 volts in the multivibrator output without attenuation. A condenser 51 connected across diodes 52 and 53 supplies surge current to provide improved rise and decay times for the ratemeter driver circuit. The current required to bring the diodes 52 and 53 into the Zener region is supplied through a resistor 54 connected to the +20 volt bus 59. A resistor 48 is connected in series with a Zener diode 49. These components 48 and 49 are connected between the −12 volt bus 58 and the ground bus 57. The collector of transistor 50 is connected to a junction between the resistor 48 and the diode 49. The diode 49 acts as a VR tube for the D.C. restoration of the ratemeter driver circuit.

The emitter of transistor 50 is connected through a resistor 55 to the +20 volt bus 59 and is connected to a diode 70 for the purpose to be described below. The ratemeter circuit is provided with a constant current generator comprising a selector switch 67A, resistors 64—66, resistor 68, transistor 69, resistor 79, and Zener diode 80. Diode 80 and resistor 79 are connected between ground and the +20 volt bus 59 to provide a reference voltage at the base of transistor 69. The diode 80 and resistor 79 are selected to have a slightly negative temperature coefficient, thus providing a constant voltage to the emitter of transistor 69. The switch 67A is provided in the emitter circuit of transistor 69 to provide a selection of constant collector currents for this transistor. The switch 67A is ganged to the aforementioned range selector switch 67B, and can be connected to any one of the resistors 64—66 to provide a range of constant currents. The switch 67A is arranged so that a single resistor, 66, is used when the range switch is on the three lower ranges. Resistors 64 and 65 are used in conjunction with the higher ranges, where the effects of stray capacity are more pronounced and make calibration of the high-range condenser 60 more difficult.

The constant current through the collector of transistor 69 must flow either through a low-leakage silicon diode 70 connected to the ratemeter driver circuit or through a similar diode 71 connected in an averaging circuit including the output meter 76. Switching of the constant current from the one circuit to the other is effected by voltage changes at a junction E in the emitter circuit of the driver transistor 50, as will be described. Junction E between diode 70 and transistor 50 is at −3 volts when the multivibrator output transistor 45 is not conducting, and is at +5 volts when this transistor is conducting. This voltage change is the signal which controls the switching of the constant collector current of transistor 69 flowing through either the diode 70 or the diode 71. When junction E is at −3 volts, diode 70 is biased forward and conducts. The voltage drop across diode 70 typically is less than 0.5 volt, and thus the junction F between diodes 70 and 71 is at −2.5 volts, reverse-biasing diode 71 to ground. Thus, at this time, diode 71 is not conducting. When junction E is at +5 volts, diode 71 is forward-biased to ground. The constant current from transistor 69 now flows through diode 71, charging one of the averaging condensers 72—74 selected by a time-constant selector switch 75. At this time, therefore, the diode 71 voltage drop typically is 0.5 volt, and thus junction F is at a voltage in the range of +0.5 to +3.5 volts, back-biasing diode 70 sufficiently to stop it from conducting. The output meter 76 is connected to the selected averaging condenser and is also connected through a resistor 77 and a resistor 78 to the grounded bus 57. The voltage on the averaging condenser for full-scale deflection of the output meter 76 is +3 volts. The average current, in μamp, through the output meter 76 is equal to the product of the counting-rate (c.p.s.), the constant current (μamp.), and the multivibrator pulse width (sec.). The switch 75 permits selection of three averaging time constants, that is, 0.3 second, 3 seconds, and 30 seconds. A tap on the resistor 78 is connected by a lead 56 to a terminal 2′ of the connector 81. Terminal 2′ is in turn connected to a recorder, not shown. A positive input signal is fed to this recorder through this line 56.

The diode-switched constant-current metering circuit ensures that the averaging circuit receives an identical pulse of current for every pulse to which the pulse height discriminator responds. Within normal operating limits, the current to the averaging circuit is constant regardless of the voltage (charge) upon the selected averaging condenser. As a result, the non-linearity of the conventional metering circuit is avoided. The use of constant current pulses also provides increased meter protection without added components. The use of the constant current diode switched circuitry, as described above, is characterized in that there is no zero drift in the metering circuit. The use of low leakage silicon diodes in the switching circuit ensures this condition of no zero drift.

The components of the above system may be housed and hermetically sealed in a plug-in unit measuring 5″ x 5½″ x 7″. The normal power consumption of the above described circuits is −12 volts at 15 ma. and +20 volts at 18 ma. The above described system has a paired-pulse resolution time of less than 2 μsec. on the upper ranges; a linearity of ±3%; no zero drift; and is calibratable to the accuracy of the indicating meter. It should be apparent that the system described herein has a low power consumption, a high linearity, and can be assembled as a compact unit.

This invention has been described by way of illustration rather than limitation and it should be apparent that the invention is equally applicable in fields other than those described.

What is claimed is:

1. A linear radiation count-rate meter system for receiving and counting pulses at rates from one cycle per second to 100,000 cycles per second, comprising a pulse-height discriminator adapted to receive an input from a source of pulses to be counted and having an output, said discriminator including means which responds only to those pulses whose amplitude exceeds a selected minimum value, means for converting said input pulses to a series of randomly spaced output pulses of susbtantially equal amplitude, the width of the output pulses varying with the height of the input pulses, and means for providing a relatively wide usable linear range for said discriminator; a Schmitt trigger circuit having an input connected to the output of said discriminator and having an output, said trigger circuit converting the input pulses thereto, on a one-to-one basis, to positive output pulses of uniform width and amplitude, and feeding these positive pulses to the output of said trigger circuit; a one-shot multivibrator circuit having an input connected to the output of said trigger circuit and having an output, said multivibrator including means for converting the input pulses thereto to positive, square-wave output pulses, means for setting at a selected value the width of said square-wave output pulses, and means for controlling said square-wave output pulses such that they are a linear function of the value of the width-setting means; and a constant current metering circuit provided with an input connected to the output of said multivibrator circuit, said metering circuit including an overaging circuit, a source of selected constant current, and means for electronically switching said source of constant current to said averaging circuit in response to each pulse received from said multivibrator circuit, the time interval the constant current is connected to said averaging circuit being controlled by said last named means and which is a function of the width of the pulse received from the multivibrator circuit.

2. The system set forth in claim 1, wherein said pulses received by said system are randomly spaced.

3. The system set forth in claim 1, wherein said discriminator includes a first transistor and a second transistor connected in the emitter-follower configuration, said transistors having a base, collector and emitter, the emitters of said transistors being connected to a common load resistor, a fixed resistor connected to said source of pulses to be counted, means for connecting said fixed resistor to the base of said first transistor, means for connecting the collector of said first transistor to ground, said means for providing a wide linear range for said discriminator comprising a diode and a source of reference potential connected to the base of said second transistor, a third amplifier transistor provided with a grounded base, a collector and an emitter, means for connecting the collector of said second transistor to the emitter of said third transistor, the output of said discriminator comprising a load resistor connected to the collector of said third transistor, and means connected across said load resistor to limit the voltage of the output pulses from said discriminator.

4. The system set forth in claim 1, wherein said multivibrator circuit includes a first, input, transistor and a second, output, transistor, said transistors each having a base, an emitter, and a collector, means coupling the output from said trigger circuit to the base of said first transistor, means for coupling the emitters of said transistors to ground, means coupling the collector of said first transistor to the base of said second transistor, means coupling the collector of said second transistor to the output of said multivibrator, and feedback circuits connected between the collector of said second transistor and to a source of negative potential and to the base of each of said transistors to prevent saturation of said transistors, said feedback circuits constituting said means for controlling said square wave output pulses such that they are a linear function of value of said width-setting means.

5. The system set forth in claim 4, wherein said width-setting means includes a condenser selected from a group of width-setting condensers, a pair of resistors, said selected condenser being connected in a regenerative circuit between the collector of said second transistor and said source of negative potential through said pair of resistors, and means connected between the base of said first transistor and a junction between said condenser and said pair of resistors to prevent said condenser from discharging through the base of said first transistor.

6. The system set forth in claim 1, wherein said constant current metering circuit includes a first, driver transistor provided with a base, a collector, and an emitter, a first diode and a second diode connected in series, means connecting the output of said multivibrator circuit to the base of said first transistor through said series connected diodes, condenser means connected across said diodes, a first resistor and a third diode connected between a source of negative potential and ground, means for connecting the collector of said first transistor to a junction between said first resistor and said third diode, a fourth diode and a fifth diode connected in opposition, a second transistor having a base, a collector, and an emitter, said averaging circuit being connected to said fourth diode, said fifth diode being connected to the emitter of said first transistor, a source of constant potential connected to the base of said second transistor, the collector of said second transistor being connected to and supplying said constant current to a junction between said fourth diode and said fifth diode, resistor means, a source of positive potential, means for connecting a selected value of said resistor means to said source of positive potential and to the emitter of said second transistor to thereby selectively control the value of said constant current supplied from the collector of said second transistor and through said fifth diode in the absence of an input pulse, said connection between the emitter of said first transistor and said fifth diode serving as the means for electronically switching said constant current from said fifth diode to said averaging circuit through said fourth diode in response to each pulse received from the output of said multivibrator circuit.

7. The system set forth in claim 6, wherein said averaging circuit includes means for selecting an averaging time constant therefor.

No references cited.